(12) United States Patent
Lucht et al.

(10) Patent No.: US 11,368,859 B2
(45) Date of Patent: Jun. 21, 2022

(54) REMOTE MANAGEMENT OF DISPLAYED NETWORK TECHNOLOGY SYMBOLS

(71) Applicant: T-Mobile USA, Inc., Bellevue, WA (US)

(72) Inventors: Thomas P. Lucht, Seattle, WA (US); Ming Shan Kwok, Seattle, WA (US); Wafik Abdel Shahid, Kenmore, WA (US); Hsin-Fu Henry Chiang, Bellevue, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 153 days.

(21) Appl. No.: 16/569,955

(22) Filed: Sep. 13, 2019

(65) Prior Publication Data

US 2021/0084503 A1 Mar. 18, 2021

(51) Int. Cl.
*H04W 24/02* (2009.01)
*H04L 12/24* (2006.01)
*H04B 17/318* (2015.01)
*H04L 41/22* (2022.01)
*H04L 41/082* (2022.01)
*H04L 41/0893* (2022.01)

(52) U.S. Cl.
CPC .......... *H04W 24/02* (2013.01); *H04B 17/318* (2015.01); *H04L 41/082* (2013.01); *H04L 41/0893* (2013.01); *H04L 41/22* (2013.01)

(58) Field of Classification Search
CPC . H04B 17/318; H04L 41/082; H04L 41/0893; H04L 41/22; H04W 24/02
See application file for complete search history.

(56) References Cited

U.S. PATENT DOCUMENTS

| | | | |
|---|---|---|---|
| 9,026,177 B2 | 5/2015 | Edwards et al. | |
| 9,642,185 B2 | 5/2017 | Edwards et al. | |
| 9,838,915 B2 | 12/2017 | Wu et al. | |
| 2018/0368016 A1 | 12/2018 | Lee et al. | |
| 2020/0037387 A1* | 1/2020 | Lee | H04W 76/27 |
| 2020/0404620 A1* | 12/2020 | Sang | H04W 68/06 |

\* cited by examiner

*Primary Examiner* — Kevin C. Harper
*Assistant Examiner* — Derrick V Rose
(74) *Attorney, Agent, or Firm* — Lee & Hayes, P.C.

(57) ABSTRACT

A wireless communication system may support two types of networks, such as a $4^{th}$-Generation (4G) network and a $5^{th}$-Generation (5G) network. An LTE base station can be configured to broadcast information regarding whether it supports Non-Standalone Architecture (NSA) dual-network connectivity in conjunction with an associated NR base station. A communication device may use one of multiple strategies to determine whether 5G services are actually available at any particular time, and may display a corresponding network technology symbol when 5G services are accessible. The multiple strategies may be stored in non-volatile memory of the communication device. Policy information received from the communication system may specify which of the multiple policies is to be the active strategy, so that the network provider can change strategies without needing to perform a firmware or software upgrade.

20 Claims, 4 Drawing Sheets

REMOTE MANAGEMENT OF DISPLAYED NETWORK TECHNOLOGY SYMBOLS

BACKGROUND

Cellular communication devices use various network radio access technologies to communicate wirelessly with geographically distributed base stations. Long-Term Evolution (LTE) is an example of a widely implemented radio access technology, which is used within $4^{th}$-Generation (4G) communication systems. New Radio (NR) is a newer radio access technology that is used in $5^{th}$-Generation (5G) communication systems. Standards for LTE and NR radio access technologies have been developed by the 3rd-Generation Partnership Project (3GPP) for use within cellular communication networks by wireless communication carriers. Note that the terms 4G and LTE are often used interchangeably when referencing certain 4G systems and components. Also, NR radio access technology may at times be referred to as 5G radio access technology.

A configuration defined by the 3GPP in the 5G NR specification, referred to as Non-Standalone Architecture (NSA), allows the simultaneous use of 4G and 5G systems for communications with a cellular communication device. NSA uses dual-network connectivity, in which a communication device uses both an LTE radio and an NR radio for downlink receptions from and uplink transmissions to corresponding LTE and NR base stations. An LTE carrier is used for control-plane signaling and for user-plane communications. An NR carrier is used for additional user-plane bandwidth as well as for data download or transmission throughput. In a scenario such as this, the LTE carrier is said to "anchor" the communication session.

Communication devices such as smartphones often have a status bar that shows, among other things, the current signal strength and/or signal quality of the current wireless connection with a base station. In addition, the status bar may include a network technology symbol that indicates the network type that is currently available to the device. For example, the network technology symbol might comprise a "4G LTE" symbol when LTE communications are available, and a "5G" symbol when 5G communications are available. The device is typically configured to display a symbol corresponding to the highest-capability radio access technology that is currently available to the device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques for determining which of multiple network technology symbols to display on the status bar of a wireless communication device when the device is operating in a cellular network of a wireless communication provider that has areas of dual-technology signal coverage. Network technology symbols might include, for example, symbols that indicate $3^{rd}$-Generation (3G), $4^{th}$-Generation (4G), Long-Term Evolution (LTE), $5^{th}$-Generation (5G), and so forth, corresponding to different wireless network standards and technologies and/or to different radio access technologies.

The described techniques may be useful when a wireless communication device is within an area that is supported by both 4G and 5G network technologies. When both 4G and 5G network technologies are available, the communication device may be used in a configuration referred to as Non-Standalone Architecture (NSA) dual connectivity. When using NSA dual connectivity, a communication device establishes and maintains a connection with a Long-Term Evolution (LTE) base station when in idle mode. Assuming that the LTE base station is collocated or otherwise associated with a 5G New Radio (NR) base station to support NSA, the device may also use NR communications during connected mode to supplement LTE communications.

In a cell that supports NSA, and that therefore has both LTE and NR base stations, the LTE base station may be configured to broadcast information indicating that the cell supports NSA dual connectivity. A wireless communication device, often referred to in this environment as a User Equipment (UE) or Mobile Station (MS), monitors information broadcast by the LTE base station to determine whether the LTE base station supports NSA. However, 5G signals at above 6 GHz frequency may be intermittent because of their higher frequencies and the device may sometimes be in a location within the cell where NR signals of the cell are too weak to be used.

Device manufacturers and network providers may use various different strategies or criteria for determining whether to display a 5G symbol or other symbol associated with advanced or enhanced capabilities. In addition, a network provider may find it desirable at times to change the logic used by the device for determining when to display the 5G or other symbol. This would preferably be accomplished without the need for a firmware or software update.

In accordance with embodiments described herein, a device is provisioned with logic to support multiple different strategies for determining whether to display the 5G symbol or other advanced-capability network technology symbol. One strategy, for example, would be to display the 5G symbol whenever attached to an LTE base station that supports NSA. Another strategy would be to display the 5G symbol only when there is an active 5G connection being used for NSA communications. Another strategy would be to periodically measure 5G signal strength, and to display the 5G symbol only when the 5G signal strength is sufficient to support 5G communications.

By default, the device is configured to use one of the multiple strategies that has initially been determined by a network provider to be appropriate. However, industry practices and standards may evolve, and the provider may at some point find that a different strategy should be used.

In order to allow a network provider to change decision strategies, the device may be configured to periodically obtain information from its cellular network regarding which of the multiple strategies should be used. Upon receiving a designation of a new or different strategy, the device uses that strategy in the future when determining whether to display the 5G symbol. In some cases, the device may also receive a designation of the symbol itself that is to be used when the designated strategy determines that 5G or other network technologies are available. For example, as the provider's network is enhanced over time it may be appropriate for the device to display a "5G+" symbol, "6G" symbol, or some other symbol indicating enhanced capabilities.

The described techniques allow a network provider to initially configure its devices to use a decision strategy that is deemed at that time to be appropriate. If it turns out that a different strategy should be used, the provider may dynamically configure its devices to use that strategy, without the need for a firmware or software update. This improves the user experience by providing the expected indication of 5G availability and also improves network performance by removing the need for firmware and/or software updates, which might otherwise create network congestion.

Although certain techniques are described in the context of 4G and 5G networks, the techniques described herein may also be used with different network types, standards, and technologies. That is, the techniques may be used more generally for first and second wireless communication networks, where a 4G network is an example of the first wireless communication network and a 5G network is an example of the second wireless communication network. In the following description, 5G is used as an example of an advanced network technology for which a corresponding symbol is to be displayed. The described techniques may be implemented using any advanced network technology, not limited to 5G, to display a symbol associated with that advanced network technology.

Furthermore, although the techniques are described in the context of a single LTE base station and a single associated NR base station, the techniques may also be used in conjunction with cell groups, where a communication device might use carrier aggregation to concurrently communicate with more than one LTE base station and/or more than one NR base station.

Figure 1:
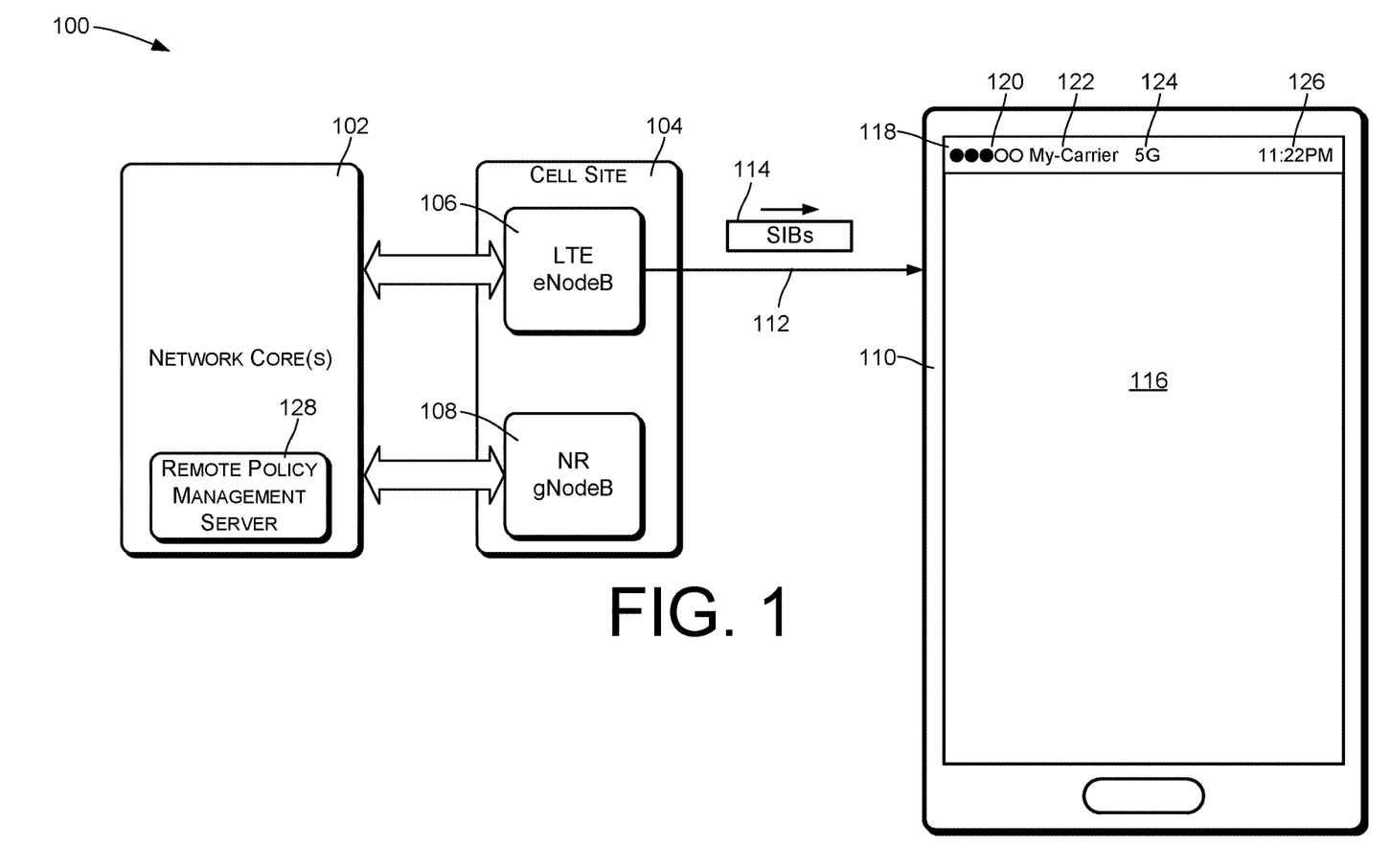
FIG. 1 is a block diagram showing relevant components of a communication network that supports Non-Standalone Architecture (NSA) dual connectivity based on $4^{th}$-Generation (4G) and $5^{th}$-Generation (5G) radio access technologies.

FIG. 1 illustrates relevant high-level components of a cellular communication system 100 such as might be implemented by a cellular communications provider. The communication system 100 has one or more network cores 102, which may include a 4G network core and/or a 5G network core. The communication system 100 also has multiple cell sites 104, only one of which is shown in FIG. 1 for purposes of discussion. Although not shown, some networks may include a 5G network core.

The illustrated cell site 104 has 4G and 5G cellular access points, and therefore supports both 4G and 5G communications. The 4G access point is implemented as an LTE base station 106, also referred to as an eNodeB, a master eNodeB, or a master base station. The 5G access point is implemented as an NR base station 108, also referred to as a gNodeB, a secondary gNodeB, or a secondary base station. In certain embodiments, a 4G network core 102 communicates with and through the LTE base station 106 and the NR base station 108. Radio communications with cellular devices are controlled by the LTE master base station.

Other communication paths may be used in other embodiments. Note that some cell sites of the system 100 might lack 5G support, and may support only 4G services and communications.

FIG. 1 shows a single cellular communication device 110, which may be one of many such devices that are configured for use with the communication system 100. In the described embodiment, the communication device 110 supports both 4G LTE and 5G NR networks and communications. Accordingly, the communication device 110 has an LTE radio (not shown) that communicates wirelessly with the LTE base station 106 of the cell site 104 and an NR radio (not shown) that communicates wirelessly with the NR base station 108 of the cell site 104.

The communication device 110 may comprise any of various types of wireless cellular communication devices that are capable of wireless data and/or voice communications, including smartphones and other mobile devices, "Internet-of-Things" (IoT) devices, smarthome devices, computers, wearable devices, entertainment devices, industrial control equipment, etc. In some environments, the communication device 110 may be referred to as a User Equipment (UE) or Mobile Station (MS).

The communication device 110 may communicate through either or both of the LTE base station 106 and the NR base station 108. In some cases or embodiments, the communication device 110 may support dual connectivity communications, also referred to herein as dual-technology connectivity, in which a single communication session can simultaneously use both a 4G connection and a 5G connection. More specifically, the communication device 110 may operate using what is referred to as a Non-Standalone Architecture (NSA), using 5G NR radio technologies to augment 4G LTE communication capabilities. When using NSA, the communication device 110 uses both an LTE carrier and an NR carrier for downlink data reception and uplink transmissions.

When the communication device 110 is in idle mode, it receives an LTE Radio Resource Control (RRC) signal 112 from the LTE base station 106. The RRC signal 112 may be broadcast for reception by multiple communication devices and may contain information regarding capabilities and characteristics of the LTE base station 106. For example, RRC messaging may include information needed by a communication device to establish bi-directional communications with the LTE base station 106. In the LTE environment, at least some of this information is provided in a periodically broadcast master information block (MIB) and multiple system information blocks (SIBs). FIG. 1 shows a single SIB 114 being broadcast by the LTE base station 106. The SIB 114 can be received by multiple communication devices, including the illustrated communication device 110.

In certain implementations, a network availability indicator is included in one of the SIBs 114 that is broadcast periodically by the LTE base station 106. The network availability indicator indicates whether the LTE base station 106 is in a geographic area within which 5G services are available. More specifically, the LTE base station includes the network availability indicator when the LTE base station is associated with and/or collocated with a 5G base station and configured to support 5G NSA dual connectivity in conjunction with the 5G base station. In some embodiments, the network availability indicator may comprise a 1-bit "upperLayerIndication" value that is contained in SIB2, in accordance with 3GPP TS 36.331 Release 15.

It is assumed, for purposes of discussion, that the device 110 illustrated in FIG. 1 is in idle mode, with no active carrier or communication channel between the NR base station 108 and the device 110. During idle mode, the device 110 may not always monitor or measure signals that are broadcast by the NR base station 108. This allows the device 110 to disable or avoid using its NR components and to reduce the power consumption that would otherwise result from monitoring NR signals during idle mode. In other embodiments, the device 110 may be configured during idle mode to detect 5G signals in order to evaluate whether 5G and/or NSA communications are possible.

The communication device 110 has a graphical display panel 116 for presenting information and for interacting with a user. A status bar 118 is typically shown at the top of the graphical display panel 116. In this example, the status bar 118 has a signal strength meter 120, a carrier identifier 122, and a network technology symbol 124. The status bar 118 also indicates the current time of day in a time field 126.

The signal strength meter 120 shows the strength and/or quality of signals or communication channels that have been established with the LTE base station 106 and/or the NR base station 108. The carrier identifier 122 corresponds to the network carrier or provider whose signals are being used for communications.

The network technology symbol 124 indicates the type of network that is being used by the communication device 110 or that is available to the communication device 110. In the example described herein, the network technology symbol 124 indicates LTE when operating in a 4G LTE environment, and 5G when operating in a 5G NR environment. Other embodiments may of course have different types of networks, corresponding to different communication protocols and radio access technologies, and may use symbols corresponding to those communication protocols and radio access technologies.

It is generally intended for the status bar 118 to show a network technology symbol 124 corresponding to the most advanced or highest-capability radio access technology that is available for use by the communication device 110. In the system described herein, a 5G symbol is displayed whenever the communication device 110 is able to use 5G NR radio access technology and NSA communications.

In the system of FIG. 1, the 4G network core has or is associated with a remote policy management server 128 that is configured to instruct the device 110 regarding how to determine whether to display the 5G symbol. As will be described below, the remote policy management server may at times provide, to each of multiple devices 110, a designation of a configuration specification that indicates the conditions under which the 5G symbol should be displayed.

Figure 2:
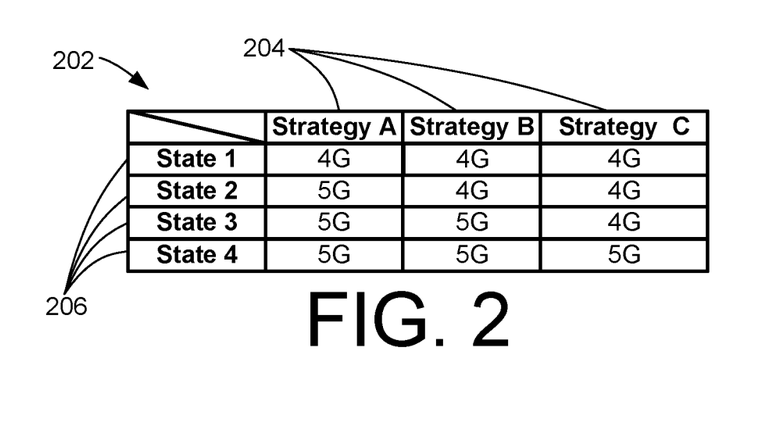
FIGS. 2 and 3 show lookup tables that may be used to determine the conditions under which a communication device should display a symbol indicating availability of advanced capabilities, such as a symbol associated with 5G services.

FIG. 2 shows an example of a table 202 that may be stored by the device 110. The table 202 contains information that may be used in determining whether to display a network technology symbol, such as a 5G symbol, indicating that 5G services are currently available to the device 110. The table 202 has columns 204 that correspond respectively to different available 5G detection strategies. The table 202 has rows 206 that specify which network technology indicator to display for each of multiple device states, for each of the available 5G detection strategies. In some embodiments, the table 202 may be stored and used as a lookup table, where columns are indexed by a configuration identifier and rows are indexed by a device state identifier. In FIG. 2, the columns are indexed by strategy identifiers A, B, and C, which may also be referred to herein as configuration identifiers. The rows 206 are indexed by state identifiers 1, 2, 3, and 4.

From top to bottom, the rows 206 correspond to device states in which it is increasingly likely that the device can use 5G and/or NSA communications. From left to right, the columns specify increasingly strict strategies, also referred to herein as configurations, for displaying the 5G network technology symbol. In some embodiments, device state 1 may correspond to a situation in which the device is able to determine unequivocally that 5G NSA communications are not currently possible. In some embodiments, state 4 may correspond to a situation in which the device is able to determine unequivocally that 5G and/or NSA communications are possible.

More specifically, the device states in this example start with a device state 1 in which it is unlikely that the device is currently able to use 5G and/or NSA communications. For device state 1, all of the available strategies A through C indicate that the device should display a 4G symbol. In device state 2, the device is more likely able to use 5G and/or NSA communications. For device state 2, strategy A specifies a 5G symbol while strategies B and C specify the 4G symbol. In device state 3, the device is very likely able to use 5G and/or NSA communications. For device state 3, strategies A and B specify the 5G symbol while strategy C specifies the 4G symbol. In device state 4, the device is even more likely able to use 5G and/or NSA communications. For device state 4, all of the strategies specify that the device should display the 5G symbol.

The device states may be defined in terms of device properties. For example, each of the device states may comprise a Boolean expression or other combination of device properties. Device properties may include, as examples:

whether the device is in idle mode or connected mode;
whether the device is attached to (either idle or connected) to an LTE base station that supports NSA.
whether a 5G signal of sufficient signal strength is detected;
whether the device is communicating with an NR base station; and
whether the device is attached to a 5G core network.

Figure 3:
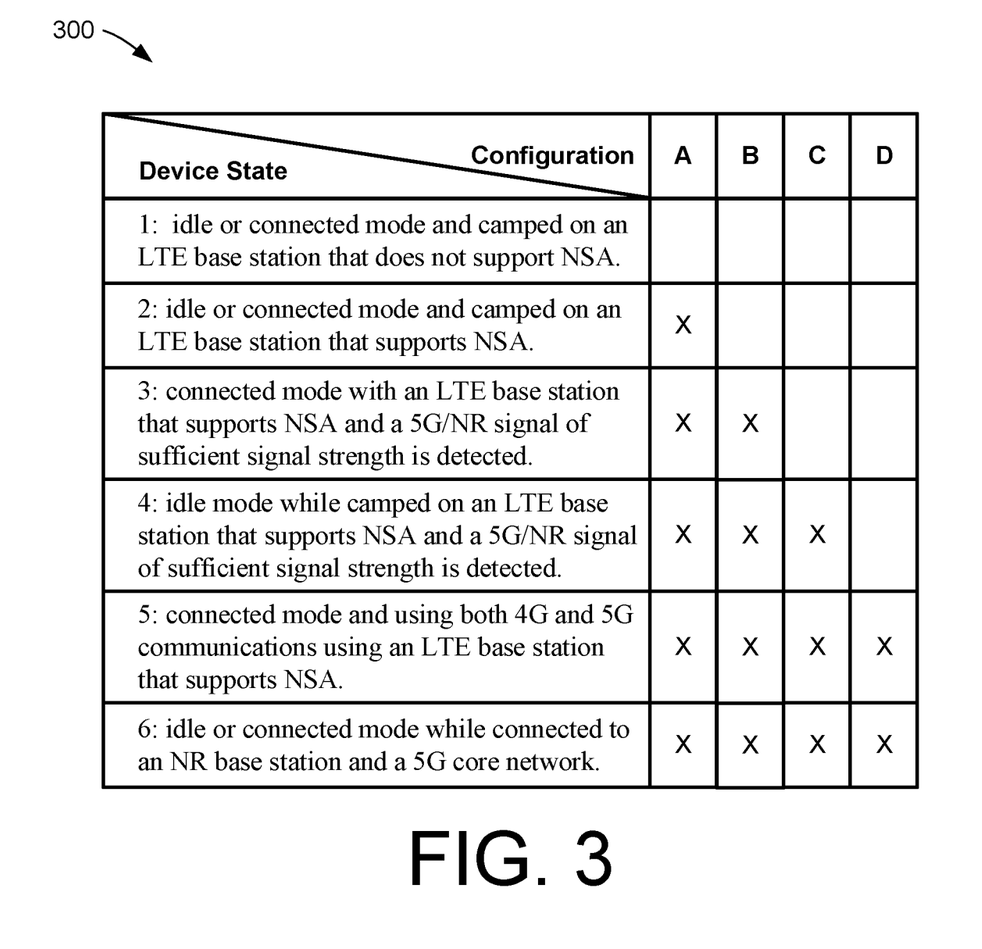

FIG. 3 shows another example table 300 that includes four configurations A through D and six device states 1 through 6. The table 300 indicates, for each configuration, the device states in which the 5G symbol is to be displayed. Specifically, for each unique configuration and device state, the table 300 shows an "x" if the 5G symbol is to be displayed.

In this example, the device states are specified in terms of the device properties discussed above, as follows:

State 1: the device is in idle or connected mode and attached to an LTE base station that does not support NSA;

State 2: the device is in idle or connected mode and attached to an LTE base station that supports NSA;

State 3: the device is in connected mode with an LTE base station that supports NSA and a 5G/NR signal of sufficient signal strength is detected;

State 4: the device is in idle mode while attached to an LTE base station that supports NSA and a 5G/NR signal of sufficient signal strength is detected;

State 5: the device is in connected mode and using both 4G and 5G communications using an LTE base station that supports NSA; and State 6: the device is in idle or connected mode and communicating with an NR base station and a 5G core network.

The terms "sufficient strength" and "sufficient signal strength" indicate a signal strength that is determined by the device to be of a strength that is sufficient to support NR radio communications. In some embodiments, the device may scan frequencies used for 5G/NR communications, measure the signal strength of one or more NR radio signals on those frequencies, and compare the signal strength to a threshold to determine whether the one or more signals are of sufficient strength.

For each of multiple configurations, the table 300 specifies the device states in which the device should display the 5G network technology symbol. In the illustrated example:

Configuration A: display the 5G network technology symbol when the device is in one or more of device states 2 through 6.

Configuration B: display the 5G network technology symbol only when the device is in one or more of device states 3 through 6.

Configuration C: display the 5G network technology symbol only when the device is in one or more of states 4 through 6.

Configuration D: display the 5G network technology symbol only when the device is in one or more of states 5 and 6.

When the table 300 does not indicate that the 5G symbol should be displayed, the device may display the 4G symbol or any other symbol corresponding to the network technology that is actually available at the time, such as the radio access technology of the base station to which the device is attached.

Figure 4:
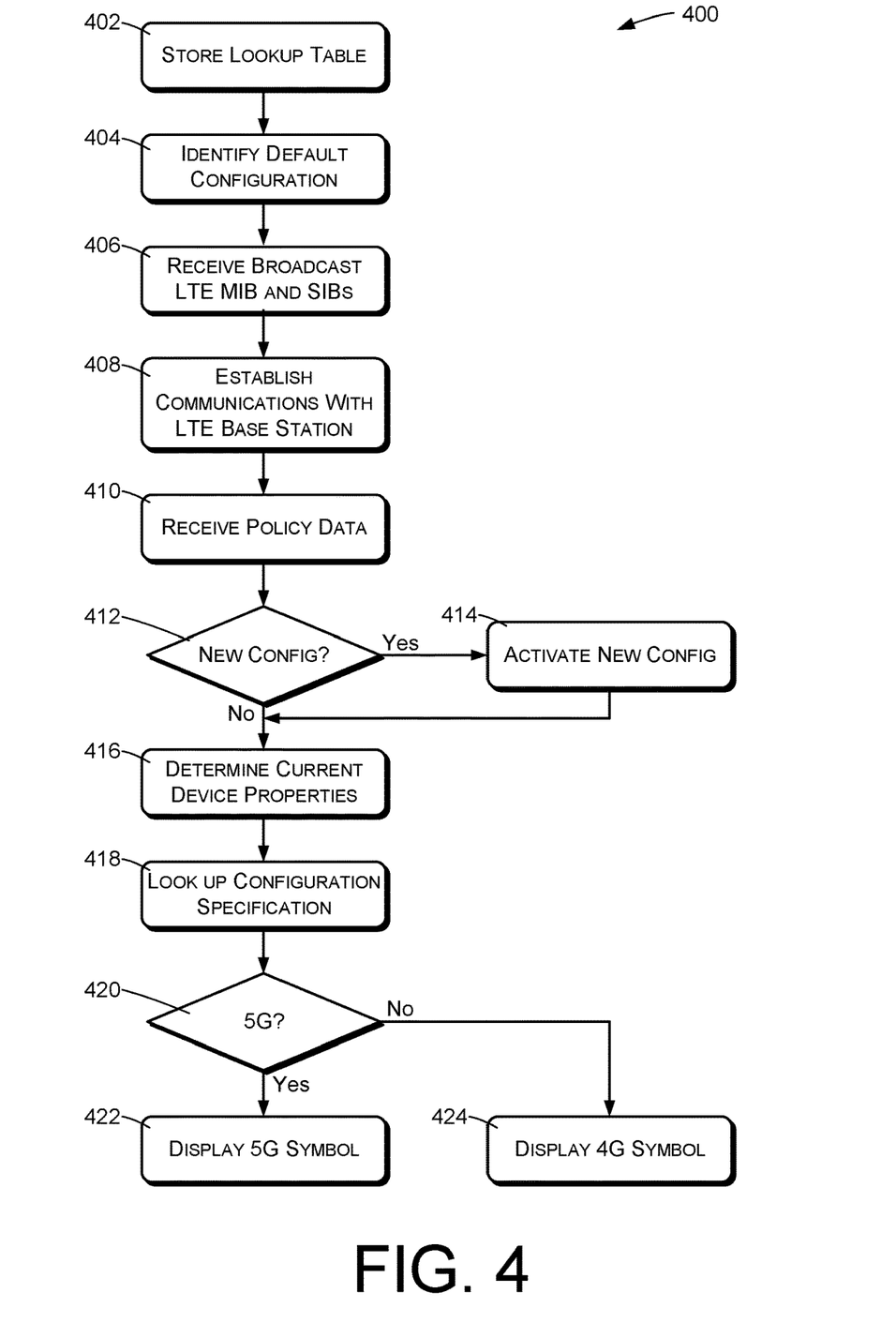
FIG. 4 is a flow diagram illustrating an example method that may be performed by a cellular communication device for displaying network technology symbols, such as 4G and 5G symbols.

FIG. 4 illustrates an example method 400 that may be performed by a cellular device or other wireless communication device that supports dual connectivity with a wireless communication network using first and second radio access technologies, such as LTE and NR radio access technologies. More specifically, the example method 400 may be performed by a communication device such as a cellular telephone or smartphone to determine whether to display a particular network technology symbol, such as a 5G symbol, in the status bar of the communication device. The example method 400 may be performed in an environment in which a first wireless communication network, such as a 4G network, serves multiple geographic areas, and in which is used in conjunction with a second wireless communication network, such as a 5G network, in some of the geographic areas.

The communication device communicates through a first, master base station to access the 4G cellular communication network. The first base station is implemented in accordance with a first radio access technology, such as LTE, and is referred to as an LTE base station. The communication device communicates through a second, secondary base station to access the 5G cellular communication network. The second base station is implemented in accordance with a second radio access technology, such as 5G NR, and is referred to as a 5G or NR base station.

An action 402 comprises storing, in non-volatile memory of the device, a lookup table or other data structure specifying the conditions under which a 5G technology symbol should be displayed by the device. The data structure includes designations of multiple device states. The data structure also includes multiple configuration specifications. Each configuration specification specifies one or more of the device states in which the device should display the 5G network technology symbol.

The tables of FIG. 2 and FIG. 3 are examples of data structures that may be used for this purpose, although the same or similar information might be specified, arranged, and/or stored in different ways. Different configuration specifications might be referenced by corresponding letters (i.e., A through D as shown in FIG. 4), by respective numbers, by codes, or by other identifiers. In some cases, the data structure may define the device states in terms of device properties, where the device properties include and/or are related to connection properties of the device. In other cases, the data structure may define the device states as logic that is to be implemented to determine whether the device is in any one or more states. Generally, a device state may be specified in any manner that allows the device to determine whether it is in that device state.

An action 404 comprises designating or otherwise identifying a default configuration specification for the device. The default configuration specification will typically be the configuration specification that the network provider has initially determined to be the most appropriate in light of industry practices, network capabilities and other factors. The currently active and/or most recently designated or selected configuration specification is referred to herein as the active configuration specification. Initially, the default configuration specification is the active configuration. However, the active configuration specification may at times be updated as described below, and replaced with a newly designated configuration specification, which is subsequently again referred to as the active configuration specification.

An action 406 comprises receiving information over a broadcast channel of the LTE base station. In certain embodiments, for example, the information may comprise a Radio Resource Control (RRC) message containing an LTE Master Information Block (MIB) and one or more LTE System Information Blocks (SIBs). The MIB and SIBs contain information that is used by the communication device to attach to the LTE base station. Most relevant to this discussion, an SIB referred to as SIB2 may include an "upperLayerIndication" value indicating that the LTE base station supports Non-Standalone Architecture (NSA) dual-network connectivity in conjunction with the NR base station. The "upperLayerIndication" value may be referred to at times herein as a 5G availability indicator.

The 5G availability indicator, when present, indicates that 5G services are generally available in the geographic area within which the communication device is located. In many cases, this indication may indicate that that the LTE base station is collocated with and/or otherwise associated with an NR base station and configured to support NSA dual-network connectivity in conjunction with the NR base station. The 5G availability indicator typically does not indicate that 5G is actually usable at any particular location within the geographic area.

The action 406 might be performed, for example, when the communication device is turned on and scans LTE frequency bands to find a suitable LTE signal, or when the communication device is handed off to a new cell.

An action 408 comprises establishing communications with the LTE base station. For example, the action 408 may comprise attaching to (i.e., either camping on or connecting to) the LTE base station, based on information received in the MIB and SIBs. As the communication device is moved about, it may attach to different LTE base stations of other network cells, after obtaining MIBs and SIBs from those LTE base stations.

An action 410 comprises receiving policy data from the wireless communication network. In some cases, the policy data may designate a new and/or different configuration specification that is to be used by the device in place of the default configuration specification or in place of a previously designated configuration specification. As described above, in some cases the new configuration specification might be designated by a specification identifier, such as one of the identifiers A, B, C, and D of FIG. 3.

The policy data may be received, in some embodiments, as part of a received MIB or SIB. The policy data may include a specification of a set of one or more device states in which the device should display the 5G network technology symbol. In some cases, device states may be specified by reference, using a configuration identifier that has been pre-associated with certain device states in which the 5G icon is to be displayed.

More generally, the policy data may be received from a remote policy management server, such as the remove policy management server 128 of FIG. 1, that is part of or associated with a 4G core network. The communication device may receive the policy data, for example, by periodically querying such a remove policy management server.

An action 412 comprises determining whether the policy data has indicated that there is a newly designated configuration specification. If there is a newly designated configuration specification, an action 414 is performed of replacing the default or other active configuration specification with the new configuration specification, so that the newly designated configuration specification becomes the active configuration specification.

An action 416 is performed after determining whether there is a newly designated configuration specification that has been designated in place of a previously designated configuration specification. The action 416 comprises evaluating or obtaining state properties of the device. The action 416 may comprise accessing components of the device to determine properties such as whether the device is in idle or connected mode, whether the device is attached to an LTE base station and/or an NR base station, whether the LTE base station to which the device is currently attached supports NSA, etc.

The action 416 may include using radio components and scanning to detect any 5G/NR signals that are of sufficient strength to support communications between the device and the NR base station. This may include scanning 5G frequencies used by the 5G network, measuring signal strength at each of the frequencies, and comparing signal strengths to a threshold.

An action 418 comprises looking up the active configuration specification. The action 418 may comprise accessing memory of the device to determine in which of multiple device states the 5G network technology symbol should be displayed.

An action 420 comprises determining whether the 5G network technology symbol should be displayed, based on the currently active configuration specification. In the described embodiments, the action 420 may comprises determining whether the device is in at least one of the device states specified by the active configuration specification. In some embodiments, the action 420 may comprise initiating logic identified by the active configuration specification to determine whether the device is in one of multiple device states, and then referring to the active configuration specification to determine which of multiple technology symbols are to be displayed for that device state. As described above, device states may be specified as combinations and/or expressions of device properties.

In response to determining that the device is in at least one of the device states specified by the active configuration specification as being associated with 5G technology, an action 422 is performed of displaying the 5G network technology symbol on the GUI of the device. Otherwise, if the configuration specification does not indicate that the 5G symbol should be displayed, an action 424 is performed, which may comprise displaying a different technology symbol, such as a 4G technology symbol or another symbol associated with a radio access technology that is currently available to the device.

The 5G network technology symbol may be any symbol intended to be associated with 5G wireless access technology, NR radio access technology, enhanced 5G technologies, and/or other network types and radio access technologies having relatively advanced and/or enhanced capabilities.

In some implementations or cases, the policy data received in the action 408 may include a designation of a replacement symbol that is to be used as the 5G network technology symbol in place of the otherwise currently active 5G network technology symbol. For example, a network provider may determine that enhanced network capabilities should use a different symbol. In these implementations or cases, the action 422 comprises displaying the newly designated symbol rather than any other 5G network technology symbol that had previously been used.

In some implementations or cases, each configuration specification may specify which of two, three, or more symbols should be displayed for each of multiple device states.

Portions of the example method 400 may be repeated as appropriate in order to periodically update the technology symbol displayed by the device. For example, the actions 416, 418, 420, 422, and 424 may be repeated to periodically determine whether the device is in a state for which the 5G symbol is to be displayed. The actions 412 and 414 may also be repeated whenever new configuration information is available. The preceding actions 406 and 408 may be performed repeatedly to connect to different LTE base stations and/or to receive updated policy data.

In some implementations or cases, the policy data may designate a configuration by specifying multiple sets of properties, rather than a configuration identifier, where each set of properties corresponds to and/or defines a device state. Policy data may include or designate logic for evaluating device states in terms of device properties and values. For example, the policy data may specify Boolean expressions of properties and/or values as definitions of device states. For example, the policy data may specify a device property and an indication of whether the device property should be true, false, or some other value, range, or set of values. Properties may in some cases be referenced by coded identifiers that are predefined by the network provider as corresponding to respective properties.

Figure 5:
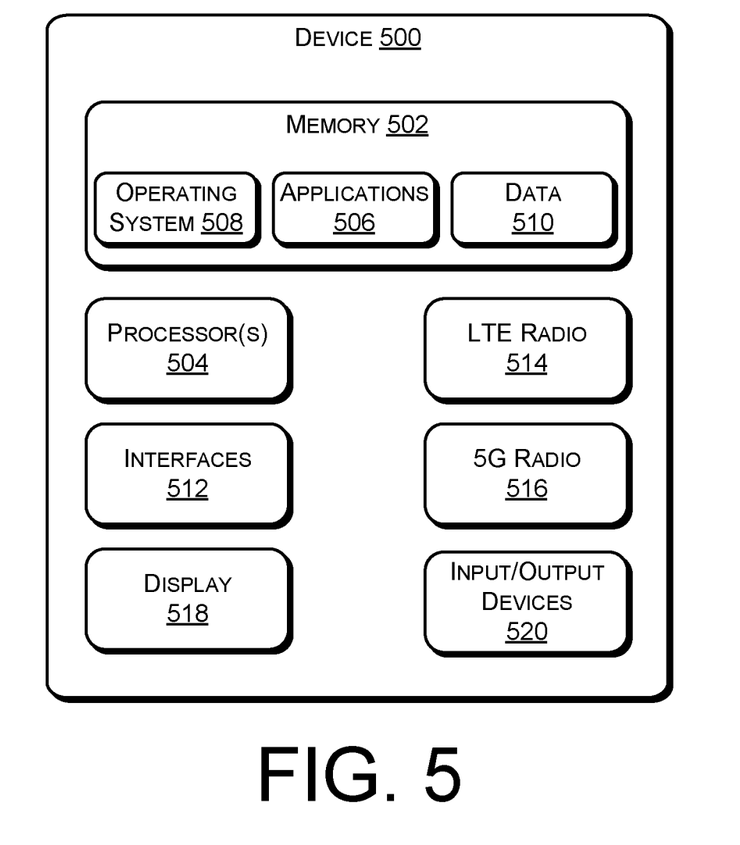
FIG. 5 is a block diagram of an example mobile communication device that may be configured in accordance with the described techniques.

FIG. 5 illustrates an example cellular communication device 500 that may be used to implement the techniques described herein. The method of FIG. 5, for example, may be implemented by a device such as the device 500. The device 500 is an example of the communication device 110, illustrating additional high-level components that are not shown in FIG. 1.

The device 500 may include memory 502 and a processor 504. The memory 502 may include both volatile memory and non-volatile memory. The memory 502 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 502 may include a SIM (subscriber identity module), which is a removable smart card used to identify a user of the device 500 to a service provider network.

The memory 502 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 502 may in some cases include storage media used to transfer or distribute instructions, applications, and/or data. In some cases, the memory 502 may include data storage that is accessed remotely, such as network-attached storage that the device 500 accesses over some type of data communication network.

The memory 502 stores one or more sets of computer-executable instructions (e.g., software) such as programs that embody operating logic for implementing and/or performing desired functionality of the device 500. The instructions may also reside at least partially within the processor 504 during execution thereof by the device 500. Generally, the instructions stored in the computer-readable storage media may include various applications 506 that are executed by the processor 504, an operating system (OS) 508 that is also executed by the processor 504, and data 510. The applications 506 and/or the operating system 508 may include logic for implementing the techniques described herein. The data 510 may include lookup tables such as those discussed above with reference to FIGS. 2 and 3.

In some embodiments, the processor(s) 504 is a central processing unit (CPU), a graphics processing unit (GPU), both CPU and GPU, or other processing unit or component known in the art. Furthermore, the processor(s) 504 may include any number of processors and/or processing cores. The processor(s) 504 is configured to retrieve and execute instructions from the memory 502.

The device 500 may have interfaces 512, which may comprise any sort of interfaces known in the art. The interfaces 512 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 500 may also have an LTE radio 514 and a 5G radio 516, which may be used as described above for implementing dual connectivity in conjunction with an eNodeB and a gNodeB. The radios 514 and 516 transmit and receive radio frequency communications via an antenna (not shown).

The device 500 may have a display 518, which may comprise a liquid crystal display (LCD) or any other type of display commonly used in telemobile devices or other portable devices. For example, the display 518 may be a touch-sensitive display screen, which may also act as an input device or keypad, such as for providing a soft-key keyboard, navigation buttons, or the like.

The device 500 may have input and output devices 520. These devices may include any sort of output devices known in the art, such as speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display. A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A cellular communication device that supports Non-Standalone Architecture (NSA) communications using 4th-Generation (4G) and 5th-Generation (5G) radio access technologies, the cellular communication device comprising:
    a graphical display panel for display of a graphical user interface (GUI);
    one or more processors;
    one or more non-transitory computer-readable media;
    the one or more non-transitory computer-readable media storing designations of multiple device states;
    the one or more non-transitory computer-readable media further storing multiple configuration specifications, wherein each of the configuration specifications specifies one or more of the multiple device states;
    the one or more non-transitory computer-readable media further storing computer-executable instructions that, when executed by the one or more processors, cause the one or more processors to perform actions comprising:
        designating a first configuration specification of the multiple configuration specifications, as a default configuration specification, the first configuration specification including a first set of strategies for displaying network technology symbols;
        determining whether the cellular communication device is in at least one of the device states specified by the first configuration specification;
        in response to determining that the cellular communication device is in the at least one of the device states designated by the first configuration specification, displaying, on the GUI, a network technology symbol indicated by the first set of strategies and the at least one of the device states designated by the first configuration specification;
        receiving policy data from a wireless communication network, wherein the policy data designates a second configuration specification, of the multiple configuration specifications, to be used in place of the first configuration specification, the second configuration specification including a second set of strategies for displaying the network technology symbols;
        after receiving the policy data, determining whether the cellular communication device is in at least one of the device states designated by the second configuration specification; and
        in response to determining that the cellular communication device is in the at least one of the device states designated by the second configuration specification, displaying, on the GUI, the network technology symbol indicated by the second set of strategies and the at least one of the device states designated by the second configuration specification.

2. The cellular communication device of claim 1, wherein each of the device states corresponds to one or more one or more connection properties of the cellular communication device.

3. The cellular communication device of claim 1, wherein determining that the cellular communication device is in the at least one of the device states designated by the first configuration specification comprises comprising measuring a signal strength.

4. The cellular communication device of claim 1, wherein the device states comprise one or more of:
- the cellular communication device is in idle mode or connected mode and attached to a 4G base station that does not support NSA;
- the cellular communication device is in idle mode or connected mode and attached to a 4G base station that supports NSA;
- the cellular communication device is in connected mode with an LTE base station that supports NSA and a 5G signal of a strength sufficient for communications is detected;
- the cellular communication device is in idle mode while attached to an LTE base station that supports NSA and a 5G signal of a strength sufficient for communications is detected;
- the cellular communication device is in connected mode and using 4G and 5G communications; or
- the cellular communication device is in idle or connected mode while communicating with an NR base station and a 5G core network.

5. The cellular communication device of claim 1, wherein each of the device states comprises one or more of:
- whether the cellular communication device is in idle mode or connected mode;
- whether the cellular communication device is attached to an LTE base station that supports NSA;
- whether a 5G signal of a strength sufficient for communications is detected;
- whether the cellular communication device is communicating with an NR base station; or
- whether the device is attached to a 5G core network.

6. The cellular communication device of claim 1, the actions further comprising:
- receiving, from the wireless communication network, a replacement symbol; and
- replacing the network technology symbol with the replacement symbol.

7. The cellular communication device of claim 1, wherein receiving the policy data comprises querying a remote policy management server associated with the wireless communication network.

8. A method performed by a wireless communication device that supports dual connectivity with a wireless communication network using first and second radio access technologies, the method comprising:
- receiving first policy data, from the wireless communication network, specifying a first set of the multiple device states;
- designating a first symbol as an active network technology symbol, wherein the first symbol is associated with a 4th-Generation (4G) radio access technology;
- determining whether the wireless communication device is in at least one of the device states of the first set of the multiple device states;
- determining a first strategy for displaying network technology symbols is associated with the at least one of the first set of device states, the first strategy associated with the first symbol that is associated with the first wireless access technology; and
- in response to determining that the wireless communication device is in at least one of the device states of the first set of the multiple device states and the first strategy is associated with the at least one of the first set of device states, displaying the first symbol;
- receiving second policy data, from the wireless communication network, specifying a second set of device states;
- determining whether the wireless communication device is in at least one of the second set of device states;
- determining a second strategy for displaying network technology symbols is associated with the at least one of the second set of device states; and
- in response to determining that the wireless communication device is in at least one of the second set of device states and the second strategy is associated with the active network technology symbol, displaying a second symbol.

9. The method of claim 8, wherein:
the second radio access technology comprises a 5th-Generation (5G) radio access technology.

10. The method of claim 8, further comprising receiving a designation of the first symbol from the wireless communication network.

11. The method of claim 8, wherein: the second set is different than the first set; and the second strategy associated with the first symbol.

12. The method of claim 11, further comprising receiving a designation of the second symbol from the wireless communication network.

13. The method of claim 8, wherein the device states include one or more of:
- the wireless communication device is in idle mode or connected mode and attached to a base station that does not support NSA;
- the wireless communication device is in idle mode or connected mode and attached to a base station that supports NSA;
- the wireless communication device is in connected mode with a base station of the first wireless access technology that supports NSA and a signal of a strength sufficient for communications is detected from a base station of the second wireless access technology;
- the wireless communication device is in idle mode while camped on a base station of the first wireless access technology that supports NSA and a signal of a strength sufficient for communications is detected from a base station of the second wireless access technology;
- the wireless communication device is in connected mode and communicating using the first wireless access technology and the second wireless access technology; or
- the wireless communication device is in idle or connected mode while communicating with a base station of the first wireless access technology and a core network of the second wireless access technology.

14. The method of claim 8, wherein each of the multiple device states comprises one or more of:
- whether the wireless communication device is in idle mode or connected mode;

whether the wireless communication device is attached to a base station of the first wireless access technology that supports NSA;

whether a signal of a strength sufficient for communications is detected from a base station of the second wireless access technology;

whether the wireless communication device is communicating with the base station of the second wireless access technology; and whether the wireless communication device is attached to a core network of the second wireless access technology.

15. A method performed by a wireless communication device that supports Non-Standalone Architecture (NSA) using 4th-Generation (4G) and 5th-Generation (5G) radio access technologies, the method comprising:

receiving first policy data from a wireless communication network, wherein the first policy data designates a first set of device states;

designating a first symbol as an active network technology symbol, wherein the first symbol is associated with 5G radio access technology;

determining whether the wireless communication device is in at least one of the first set of device states;

determining a first strategy associated with the at least one of the first set of device states;

in response to determining that the wireless communication device is in at least one of the first set of device states and the first strategy is associated with the active network technology symbol, displaying the active network technology symbol;

receiving second policy data from the wireless communication network, wherein the second policy data designates a second set of device states;

determining whether the wireless communication device is in at least one of the second set of device states;

determining a second strategy associated with the at least one of the second set of device states; and in response to determining that the wireless communication device is in at least one of the second set of device states and the second strategy is associated with the active network technology symbol, displaying the active network technology symbol.

16. The method of claim 15, wherein the second policy data designates a second symbol to replace the first symbol as the active network technology symbol.

17. The method of claim 15, further comprising receiving a designation of the first symbol from the wireless communication network.

18. The method of claim 15, further comprising:
receiving a designation of a second symbol from the wireless communication network; and
replacing the first symbol with the second symbol as the active network technology symbol.

19. The method of claim 15, wherein individual states of the first set of device states include one or more of:
the wireless communication device is in idle mode or connected mode and attached to a 4G base station that does not support NSA;
the wireless communication device is in idle mode or connected mode and attached to a 4G base station that supports NSA;
the wireless communication device is in connected mode with an LTE base station that supports NSA and a 5G signal of a strength sufficient for communications is detected;
the wireless communication device is in idle mode while attached to an LTE base station that supports NSA and a 5G signal of a strength sufficient for communications is detected;
the wireless communication device is in connected mode and using 4G and 5G communications; or
the wireless communication device is in idle or connected mode while communicating with an NR base station and a 5G core network.

20. The method of claim 15, wherein individual states of the first set of device states comprises one or more of:
whether the wireless communication device is in idle mode or connected mode;
whether the wireless communication device is attached to an LTE base station that supports NSA;
whether a 5G signal of a strength sufficient for communications is detected;
whether the wireless communication device is communicating with an NR base station; or
whether the wireless communication device is attached to a 5G core network.

* * * * *